United States Patent Office 3,277,194
Patented Oct. 4, 1966

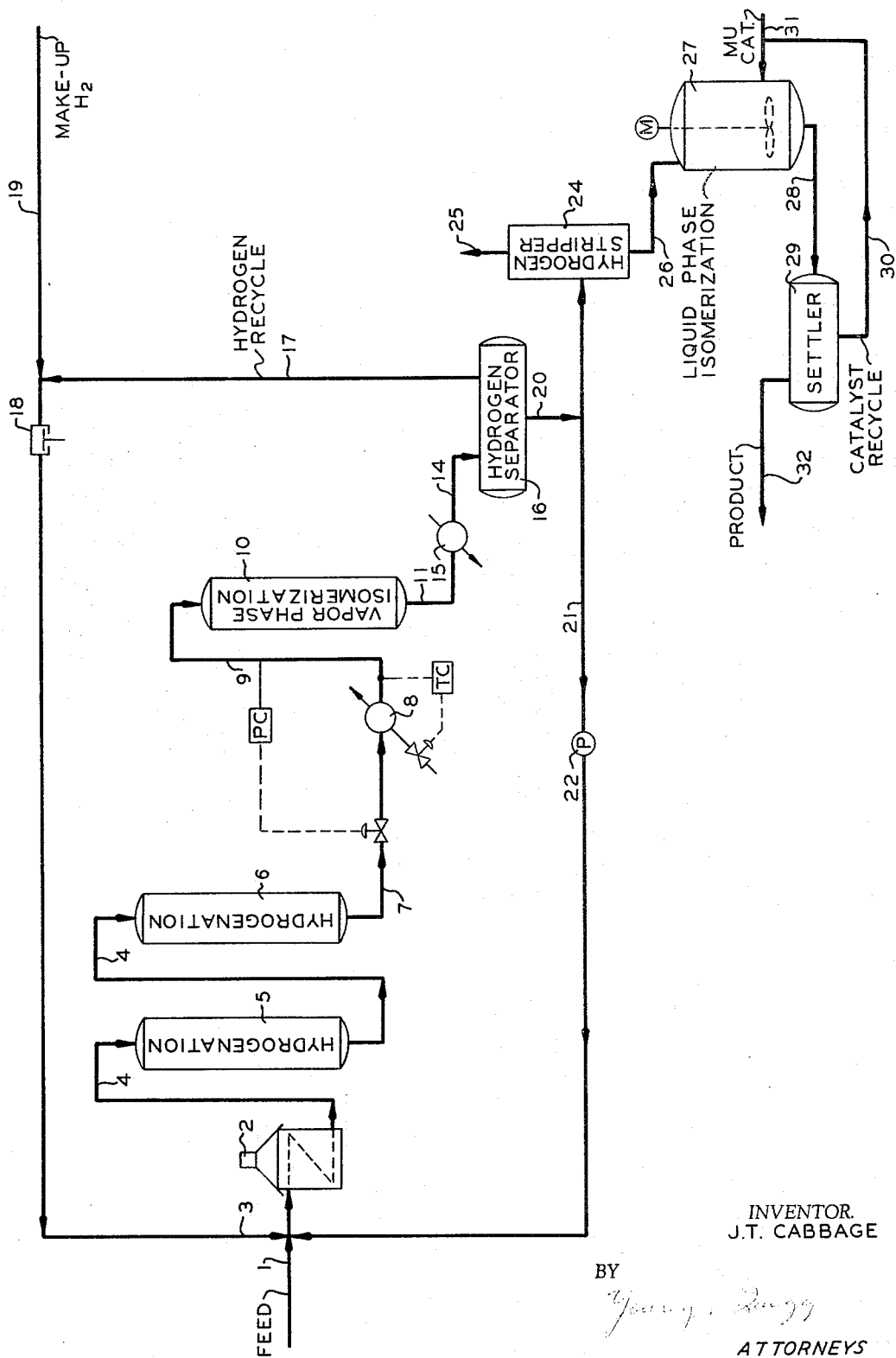

3,277,194
TWO-STAGE ISOMERIZATION SYSTEM
John T. Cabbage, Bartlesville, Okla., assignor to Phillips
Petroleum Company, a corporation of Delaware
Filed Sept. 14, 1962, Ser. No. 223,762
9 Claims. (Cl. 260—666)

This invention relates to two-stage isomerization of hydrocarbons, in which the first isomerization stage is conducted in vapor phase and the second isomerization stage is conducted in liquid phase. In one of its aspects, the invention relates to process and apparatus for isomerizing a stream comprising n-hexane and methylcyclopentane wherein the first isomerization is carried out in the vapor phase in the presence of a platinum-type catalyst and wherein the isomerization in the second stage is carried out in the liquid phase and in the presence of an aluminum halide complex-type catalyst. In another aspect, the invention relates to process and apparatus for conversion of a hydrocarbon stream comprising n-hexane, methylcyclopentane and benzene which comprises a combination of hydrogenation and a two-stage isomerization, the first isomerization being conducted in the vapor phase and the second isomerization being conducted in the liquid phase.

In the isomerization of mixed hexanes, there are two principal reactions of importance.

(1)

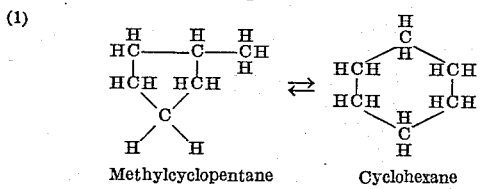

Methylcyclopentane      Cyclohexane and (2)

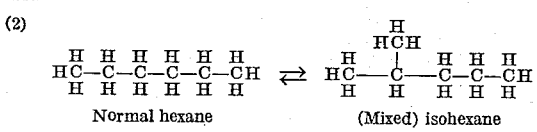

Normal hexane      (Mixed) isohexane

These primary reactions are desirably effected in a single reaction system. Lower temperatures favor the equilibrium concentrations of both cyclohexane and isohexane, as shown below:

TABLE I

| Temperature, ° F. | Mol percent cyclohexane (Cyclohexane in methylcyclopentane) | Mol percent isohexane (Isohexane in normal hexane) |
|---|---|---|
| 50 | 90 | 99 |
| 100 | 84 | 98 |
| 150 | 76 | 97 |
| 200 | 65 | 96 |

In the temperature range shown in Table I, the reaction of methylcyclopentane→cyclohexane proceeds at a rapid rate, the equilibrium concentration of cyclohexane being reached in about 15 minutes of reaction time. However, the reaction rate for normal hexane→isohexane proceeds at a much slower rate, so that for a 15 minute reaction time at 50° F., for example, only about 3 to 5 percent isohexane in the normal hexane is realized. Higher temperatures, however, speed up the reaction rate so that at 150° F. and 15 minutes reaction time, the isohexane in normal hexane will be 40 to 50 percent, even though the equilibrium concentration is lower at 150° F., being 97 percent, compared with the equilibrium at 50° F. of 99 percent. It is seen that a relatively long reaction time would be required in order to attain the isohexane in normal hexane equilibrium. Such long reaction times, of course, are not practical for commercial operations.

Consequently in conventional operations using a single reaction zone to convert methylcyclopentane and accompanying hexane to obtain cyclohexane as the main product and isohexanes as the desirable by-products, temperatures are set at a low figure to increase cyclohexane production, and the reaction of normal hexane→isohexane proceeds as far as possible for the relatively short reaction time used, e.g., 45 minutes. This reaction time, at the low temperature, e.g., 100° F., results in not more than 10 mol percent of isohexane. The conversion of methylcyclopentane to cyclohexane under these conditions is about 84 mol percent.

In my co-pending application Serial No. 4,731, filed January 26, 1960, now U.S. Patent 3,054,832, there is disclosed and claimed a process for the isomerization of a stream of hydrocarbons consisting essentially of methylcyclopentane and normal hexane to produce optimum yields of cyclohexane and isohexanes therefrom which comprises conducting the isomerizations at a temperature in the range of about 50° F. to about 200° F. in the presence of an isomerization catalyst effective in said range in two zones; in a first zone, isomerizing the entire stream at a relatively high temperature and relatively longer reaction time than in a second zone and in a second zone subjecting the once isomerized stream thus obtained at a lower temperature and for a substantially shorter period of reaction time.

I have now discovered that a two-stage isomerization can be carried out by process and apparatus wherein vapor phase isomerization is conducted in a first stage in an inexpensive vessel and wherein the second stage comprises a relatively expensive glass-lined stirred liquid phase aluminum halide complex-type reactor.

Accordingly, it is an object of this invention to provide an improved isomerization process for the conversion of methylcyclopentane and hexane to cyclohexane and isohexanes, respectively. It is another object of the invention to provide process and apparatus for isomerization of methylcyclopentane and n-hexane in relatively inexpensive apparatus. It is still another object of the invention to provide process and apparatus for conversion of an existing isomerization plant so as to increase its production of isohexanes at only small additional cost.

Other aspects, objects and the several advantages of the invention are apparent from a study of this disclosure, the drawing and the appended claims.

According to the invention, there are provided a process and apparatus for isomerization of a stream comprising n-hexane and methylcyclopentane to obtain i-hexanes and cyclohexane wherein the isomerization is conducted in two serial zones, the isomerization in the first zone being at a relatively higher temperature and the isomerization in the second zone being at a relatively lower temperature, and wherein the isomerization in the first zone is conducted in the vapor phase and the isomerization in the second zone is conducted in the liquid phase.

There are further provided process and apparatus for isomerizing a stream comprising n-hexane and methylcyclopentane which comprises:

(a) Passing the stream in vapor phase to a first isomerization zone wherein the temperature is maintained in the range of about 350 to about 700° F., (b) Contacting the stream in the first zone with a platinum-type catalyst for a relatively short time, e.g., about one minute to about five minutes, (c) Passing the thus-isomerized stream in liquid phase to a second isomerization zone wherein the temperature is maintained in the range of about 50 to about 200° F., (d) Contacting the stream in the second zone with an aluminum halide complex-type catalyst for a relatively long time, and (e) Recovering from the second zone a product comprising i-hexanes and cyclohexane.

The drawing is a representation in flow diagram form of a presently preferred embodiment of my invention.

Referring now to the drawing in detail, a feed comprising n-hexane, isohexane, cyclohexane, methylcyclopentane and benzene is passed by way of conduit 1 to a feed heater 2. This feed material in conduit 1 has admixed with it hydrogen by way of conduit 3, as will be later described. The heated feed is passed by way of conduit 4 to first and second hydrogenation zones 5 and 6, wherein benzene in the feed stream is converted to cyclohexane. The resulting stream is passed by way of conduit 7 to heat exchanger 8, and the vaporized feed is passed by way of conduit 9 to the first isomerization zone 10. The vaporized stream is isomerized in this zone in the presence of a platinum-type catalyst, such as platinum-halogen-alumina, platinum-silica-alumina, etc., at conditions favoring conversion of n-hexane to isohexanes. Effluent from this isomerization zone is removed by way of conduit 11, and is passed by way of conduit 14 and cooler 15 to a hydrogen separator 16. Hexanes in stream 14 are condensed by cooler 15, and a hydrogen-rich gas is separated from the condensed hydrocarbons in vessel 16. This hydrogen-rich gas can be returned by way of conduit 17 and compressor 18 to the afore-mentioned conduit 3. Make-up hydrogen can be added by way of conduit 19. The thus-isomerized liquid hydrocarbon is removed from the separator 16 by way of conduit 20; a portion can be returned by way of conduit 21 and pump 22 to conduit 1 as fresh feed diluent to control hydrogenation temperature, and the remainder is passed by way of conduit 23 to a hydrogen stripper 24. In stripper 24, remaining gases are removed by way of conduit 25 for further utility, and the isomerized liquid is passed by way of conduit 26 to a liquid phase isomerization zone 27. This second isomerization zone 27 utilizes an aluminum halide complex-type catalyst, and is operated to effect isomerization of methylcyclopentane to produce cyclohexane, and additionally converts some remaining n-hexane to isohexanes. Reactor effluent is passed by way of conduit 28 to a settler 29, wherein the catalyst complex is separated from the isomerized product and can be returned by way of conduit 30 to the reaction zone. Make-up catalyst can be added by way of conduit 31. Isomerized product is removed from settler 29 by way of conduit 32 and passed to further utility.

Although it is presently preferred, according to the drawing, to hydrogenate the feed prior to the first stage of isomerization, this hydrogenation can follow the first stage of isomerization and can, in fact, be omitted, as for example, when the benzene content of the feed is low. If isomerization is effected at higher temperatures, e.g., above about 650° F., whereby benzene is produced from cyclohexane, then hydrogenation should follow this first isomerization step.

Conditions obtaining in the first or vapor phase isomerization using a platinum-type catalyst preferably include temperatures in the range of about 350 to about 700° F., and pressure in the range of about 400 to about 500 p.s.i. When hydrogenating, the preferable ratio of hydrogen to hydrocarbon is in the range of about 0.3:1 to about 2:1. There is a loss of cyclohexane to methylcyclopentane in this first stage, but this is not detrimental since the second stage aluminum halide complex isomerization recovers the cyclohexane to equilibrium production, and, furthermore, effects a gain in conversion of n-hexane to the isomeric hexanes. It is pointed out that the conversion of methylcyclopentane to cyclohexane is the same as effected using aluminum chloride complex catalytic isomerization alone; but, the conversion of normal hexane to the isomeric hexanes by my invention is about 25 percent greater than by conventional aluminum chloride complex catalytic isomerization.

The optimum reaction conditions in the aluminum halide complex isomerization system for conversion of methylcyclopentane to cyclohexane are not favorable for the conversion of n-hexane to isohexanes. This is because the conversion of methylcyclopentane to cyclohexane is very rapid with low temperatures favoring higher cyclohexane to methylcyclopentane equilibrium, whereas the conversion of n-hexane to isohexanes is much slower with lower temperatures also favoring high equilibrium concentrations of the isomeric hexanes. However, in the conversion of n-hexane to isohexanes, equilibrium is not attained at reasonable times, hence, this system is time-limited. Thus, in the conventional unit, the cyclohexane:methylcyclopentane volume ratio may reach the 4:1 equilibrium ratio at 120° F. (aluminum chloride complex catalyst), but the isohexanes:n-hexane equilibrium ratio is not reached. This latter equilibrium ratio is about 19:1, but only about 1:1 is the ratio of isohexanes to n-hexane realized.

Higher temperatures will speed up the conversion of n-hexane to isohexanes, but are detrimental to the methylcyclopentane to cyclohexane reaction.

The conversion of n-hexane to isohexanes is in the range of 20 to 40 percent in the first high temperature stage which is a fast reaction at the temperatures used, and approaches the lower equilibrium rapidly at these conditions.

My co-pending application Serial No. 4,731, now Patent No. 3,054,832, effects two-stage liquid phase aluminum chloride complex catalytic isomerization, the first stage at a higher temperature than the second stage. However, these reatcor vessels are both the expensive glass-lined stirred reactors. My present invention uses the single expensive liquid phase reactor, but employs an inexpensive vapor phase unit to enable a plant to increase its production of isohexane at but a small cost for the facilities to make this increased product. This afore-mentioned application will produce more isohexane (and the same cyclohexane) than my present invention; however, in some plants, the justification for the greater cost of new liquid phase reaction facilities cannot be justified, whereas the lesser cost of the vapor phase reaction facilities can be justified.

The conventional plant, using a single liquid phase reactor, will convert (using 30–35 minutes total reaction time) at 120° F. about 12 volume percent of the n-hexane to isohexanes; and at about 140° F. about 45 volume percent of n-hexane to isohexanes. And, at 120° F., the conversion of methylcyclopentane to cyclohexane is about 81 percent; while at 140° F., the conversion is but 77 percent.

*Example I*

The following is a comparison between operation with a conventional single-stage liquid phase isomerization unit, operation with a two-stage liquid phase isomerization according to the invention of co-pending application Serial No. 4,731, now Patent No. 3,054,832, and operation according to the present invention, utilizing a two-stage isomerization wherein the first stage is operated in the vapor phase and the second stage is operated in the liquid phase.

sentially of an isomerizable mixture of n-hexane and methycyclopentane and cyclohexane wherein said cyclohexane comprises at least about 10 volume percent of said isomerizable mixture and wherein the concentration of said methylcyclopentane is substantially greater than the concentration of said cyclohexane which process comprises:

(a) passing said stream in vapor phase to a first iso-

TABLE II

| Component | Feed, Bbls. | Conventional [1] | | Present Invention | | S.N. 4731 [3] | | S.N. 4731 [5] | |
|---|---|---|---|---|---|---|---|---|---|
| | | 120° F. Product, Bbls. | 140° F. Product, Bbls. | 120° F.[2] Product, Bbls. | 140° F.[2] Product, Bbls. | 120° F.[4] Product, Bbls. | 140° F.[4] Product, Bbls. | 120° F.[4] Product, Bbls. | 140° F.[4] Product, Bbls. |
| $iC_6$ | 7.0 | 13.1 | 30.0 | 37.7 | 42.0 | 44.5 | 49.6 | 21.2 | 37.8 |
| $nC_6$ | 51.0 | 44.9 | 28.0 | 20.3 | 16.0 | 13.5 | 8.4 | 36.8 | 20.2 |
| MCP | 32.0 | 8.3 | 10.0 | 8.3 | 10.0 | 8.3 | 10.0 | 8.3 | 10.0 |
| $CyC_6$ | 11.6 | 35.3 | 33.6 | 35.3 | 33.6 | 35.3 | 33.6 | 35.3 | 33.6 |
| Total | 101.6 | 101.6 | 101.6 | 101.6 | 101.6 | 101.6 | 101.6 | 101.6 | 101.6 |

[1] Residence, 35 minutes liquid phase.
[2] Residence, 1 minute vapor phase, 30 minutes liquid phase (temperatures are liquid phase).
[3] 30 minutes in first stage, 15 minutes last stage.
[4] Final liquid phase temperature.
[5] 5 minutes in first stage, 30 minutes last stage.

It can be seen by the above tabulation that, when operating according to my invention of 1 minute in the first or high temperature zone and 30 minutes in the second 120° F. or low temperature zone, as compared with the same conditions in Serial No. 4,731, I can produce more isohexane than and the same cyclohexane as application Serial No. 4,731.

*Example II*

The following is an example of operation according to the drawing.

merization zone wherein the temperature is maintained in the range of about 350 to about 700° F., (b) contacting said stream in said first zone with a platinum-type catalyst for a relatively short time of from about 1 minute to about 5 minutes to convert n-hexane to i-hexane, in which zone said cyclohexane is partially isomerized to additional methylcyclopentane as required by the equilibrium in said first zone, (c) passing the thus-isomerized stream in liquid phase to a second isomerization zone wherein the tempera-

TABLE III

| Composition | Stream No. | | | | | | | | | | | |
|---|---|---|---|---|---|---|---|---|---|---|---|---|
| | 1 | | 4 | | 7 | | 14 | | 21 | | 32 | |
| | Vol. percent | B./d. | Vol. percent | B./d. | Vol. percent | B./d. | Vol. percent | B./d. | Vol. percent | B./d. | Vol. percent | B./d. |
| Isohexanes | 7 | 350 | 12.1 | 1,220 | 12.0 | 1,220 | 17.1 | 1,740 | 17.1 | 870 | 37.1 | 1,885 |
| n-Hexane | 51 | 2,550 | 45.3 | 4,580 | 45.1 | 4,580 | 40.0 | 4,060 | 40.0 | 2,030 | 20.0 | 1,015 |
| Methylcyclopentane | 32 | 1,600 | 33.2 | 3,345 | 32.9 | 3,345 | 34.3 | 3,490 | 34.3 | 1,745 | 8.2 | 415 |
| Benzene | 8 | 400 | 4.0 | 400 | | | | | | | | |
| Cyclohexane | 2 | 100 | 5.4 | 535 | 10.0 | 1,015 | 8.6 | 870 | 8.6 | 435 | 34.7 | 1,765 |
| Total | 100 | 5,000 | 100.0 | 10,080 | 100.0 | 10,160 | 100.0 | 10,160 | 100.0 | 5,080 | 100.0 | 5,080 |

Conditions obtained during this example are as follows:

Hydrogen rate (conduit 3): 9 mols hydrogen / mol benzene.
Hydrogenation vessels 5 and 6: pressure, 400 p.s.i.; temperature, 450° F.; catalyst, nickel or kieselguhr.
Vapor phase insomerization, vessel 10: pressure, 380 p.s.i.; temperature, 600° F.; catalyst, platinum-type.
Liquid phase isomerization, vessel 27: pressure 170 p.s.i.; temperature, 120° F.; catalyst, aluminum chloride complex.

Reasonable variation and modification are possible within the scope of the foregoing disclosure, the drawing and the appended claims to the invention, the essence of which is that there are provided process and apparatus for two-stage isomerization of mixed hexanes wherein the first stage of isomerization is conducted in the vapor phase and the second stage of isomerization is effective in the liquid phase.

I claim:

1. A process for isomerizing a stream consisting essentially of an isomerizable mixture of n-hexane and methycyclopentane and cyclohexane wherein said cyclohexane comprises at least about 10 volume percent of said isomerizable mixture and wherein the concentration of said methylcyclopentane is substantially greater than the concentration of said cyclohexane which process comprises:

(a) passing said stream in vapor phase to a first isomerization zone wherein the temperature is maintained in the range of about 350 to about 700° F., (b) contacting said stream in said first zone with a platinum-type catalyst for a relatively short time of from about 1 minute to about 5 minutes to convert n-hexane to i-hexane, in which zone said cyclohexane is partially isomerized to additional methylcyclopentane as required by the equilibrium in said first zone, (c) passing the thus-isomerized stream in liquid phase to a second isomerization zone wherein the temperature is maintained in the range of about 50 to about 200° F., (d) contacting the stream in said second zone with an aluminum halide complex-type catalyst for a relatively long time of at least about 30 minutes to convert additional n-hexane to i-hexane and to isomerize methylcyclopentane to cyclohexane, and (e) recovering from said second zone a product consisting essentially of i-hexanes and cyclohexane.

2. The process of claim 1 wherein the residence time in said first zone is about 5 minutes and the residence time in said second zone is about 30 minutes.

3. The process of claim 1 wherein the temperature in said second zone is in the range of about 120 to about 140° F.

4. A process for treating a stream comprising n-hexane, methylcyclopentane cyclohexane, and benzene to obtain i-hexanes and cyclohexane which comprises:

(a) admixing with said stream hydrogen in an amount sufficient to provide a hydrogen-to-hydrocarbon mol ratio in the range of about 0.3:1 to about 2:1, (b) maintaining the admixture of step (a) at hydrogenation conditions to convert benzene in said admixture into cyclohexane, (c) passing the hydrogenated stream of step (b) in vapor phase to a first isomerization zone wherein the temperature is maintained in the range of about 350 to about 700° F., (d) contacting the stream in said first zone with a platinum-type catalyst for a relatively short time of from about 1 minute to about 5 minutes to convert n-hexane to i-hexane in which zone said cyclohexane is partially isomerized to additional methylcyclopentane as required by the equilibrium in said first zone, (e) separating the effluent from said first zone into a hydrogen-rich gas stream and a hydrocarbon liquid stream comprising n-hexane, i-hexane, cyclohexane, and methylcyclopentane, (f) passing said hydrocarbon liquid stream of step (e) to a second isomerization zone wherein the temperature is maintained in the range of about 50 to about 200° F., (g) contacting said hydrocarbon liquid stream in said second zone with an aluminum halide complex-type catalyst for a relatively longer time of at least about 30 minutes to convert additional n-hexane to i-hexane and to isomerize methylcyclopentane to cyclohexane, (h) recovering from said second zone a product consisting essentially of i-hexanes and cyclohexane, and (i) returning a portion of the thus-recovered product of step (h) to step (a).

5. The process of claim 4 wherein the hydrogen-rich gas stream of step (e) is returned to step (a) and wherein said halide of step (g) is chloride.

6. The process of claim 4 wherein the residence time in said first zone is about 5 minutes and the residence time in said second zone is about 30 minutes.

7. The process of claim 4 wherein the temperature in said second zone is in the range of about 120 to about 140° F.

8. The process of claim 1 wherein the concentrations of said methylcyclopentane, n-hexane, and cyclohexane are respectively about 30, 50, and 10 volume percent of said isomerizable mixture.

9. A process for isomerizing a stream consisting essentially of an isomerizable mixture of n-hexane, methylcyclopentane, and cyclohexane wherein the relative concentrations of cyclohexane and methylcyclopentane are such that the equilibrium approached in a first isomerization stage hereinafter detailed promotes the conversion of cyclohexane to methylcyclopentane which process comprises:

(a) passing said stream in vapor phase to a first isomerization zone wherein the temperature is maintained in the range of about 350 to about 700° F., (b) contacting said stream in said first zone with a platinum-type catalyst for a relatively short time of from about 1 minute to about 5 minutes to convert n-hexane to i-hexane in which zone said cyclohexane is partially isomerized to additional methylcyclopentane as required by the equilibrium in said first zone, (c) passing the thus-isomerized stream in liquid phase to a second isomerization zone wherein the temperature is maintained in the range of about 50 to about 200° F., (d) contacting the stream in said second zone with an aluminum halide complex-type catalyst for a relatively long time of at least about 30 minutes to convert additional n-hexane to i-hexane and to isomerize methylcyclopentane to cyclohexane, and (e) recovering from said second zone a product consisting essentially of i-hexanes and cyclohexane.

References Cited by the Examiner
UNITED STATES PATENTS

| | | | |
|---|---|---|---|
| 2,386,784 | 10/1945 | Fragen | 260—683.67 |
| 2,938,935 | 5/1960 | Findlay | 260—683.67 |
| 2,951,887 | 9/1960 | Folkins et al. | 260—683.65 |
| 3,054,832 | 9/1962 | Cabbage | 260—666 |
| 3,078,323 | 2/1963 | Kline et al. | 260—683.73 |

DELBERT E. GANTZ, *Primary Examiner.*

P. M. COUGHLAN, A. D. SULLIVAN, *Examiners.*

P. P. GARVIN, L. FORMAN, V. O'KEEFE,
*Assistant Examiners.*